United States Patent
Moulin et al.

(10) Patent No.: US 10,584,620 B2
(45) Date of Patent: Mar. 10, 2020

(54) LUBRICATION OF BACKS OF CAMS BY OIL RECOVERY

(71) Applicant: Nissan Motor Co., Ltd., Yokohama-shi, Kanagawa (JP)

(72) Inventors: Jean-François Moulin, Puteaux (FR); Etienne De Malet, Versailles (FR); Sylvie Foreau-Johan, Garches (FR)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/314,878

(22) PCT Filed: Jun. 15, 2017

(86) PCT No.: PCT/FR2017/051555
§ 371 (c)(1),
(2) Date: Jan. 3, 2019

(87) PCT Pub. No.: WO2018/007706
PCT Pub. Date: Jan. 11, 2018

(65) Prior Publication Data
US 2019/0309666 A1    Oct. 10, 2019

(30) Foreign Application Priority Data
Jul. 4, 2016  (FR) ..................... 16 56349

(51) Int. Cl.
*F01M 9/10*     (2006.01)
*F01L 1/047*    (2006.01)
(Continued)

(52) U.S. Cl.
CPC ............. *F01M 9/101* (2013.01); *F01L 1/047* (2013.01); *F01L 1/08* (2013.01); *F16N 7/363* (2013.01); *F01L 1/18* (2013.01); *F01L 2810/02* (2013.01)

(58) Field of Classification Search
CPC ..... F01L 1/053; F01L 1/08; F01L 1/46; F01L 2810/02; F01M 9/101; F01M 9/102; F01M 9/105
(Continued)

(56) References Cited

U.S. PATENT DOCUMENTS 3,628,513 A * 12/1971 Grosseau ............... F01M 9/107
                                                123/90.34
3,958,541 A *  5/1976 Lachnit .................. F01M 9/102
                                                123/90.34
(Continued)

FOREIGN PATENT DOCUMENTS

DE        3935154 A1    10/1990
FR        2679601 A1     1/1993
FR        2746846 A1    10/1997

*Primary Examiner* — Jorge L Leon, Jr.
(74) *Attorney, Agent, or Firm* — Global IP Counselors, LLP

(57) ABSTRACT

A valve actuating device includes a camshaft, a cam, and a lubricant conducting device. The camshaft has an oil supply duct extending in a longitudinal direction of the camshaft and a discharge orifice extending in a radial direction of the camshaft and in fluid communication with the oil supply duct. The cam is fixedly mounted to the camshaft to rotate with the camshaft, the cam having a contact surface and a lateral wall facing in an axial direction of the camshaft towards the discharge orifice. The lubricant conducting device is arranged to direct oil over the lateral wall of the cam towards the contact surface.

15 Claims, 2 Drawing Sheets

(51) Int. Cl.
  *F01L 1/08*   (2006.01)
  *F16N 7/36*   (2006.01)
  *F01L 1/18*   (2006.01)
(58) Field of Classification Search
  USPC .................................. 123/90.27, 90.34, 90.6
  See application file for complete search history.

(56) References Cited

U.S. PATENT DOCUMENTS

| | | | | |
|---|---|---|---|---|
| 4,896,634 | A * | 1/1990 | Kronich | .................... F01M 1/02 |
| | | | | 123/196 W |
| 4,957,079 | A * | 9/1990 | Nakatani | ............... F01L 1/0532 |
| | | | | 123/196 M |
| 5,404,845 | A * | 4/1995 | Hannibal | ................. F01L 1/047 |
| | | | | 123/90.16 |
| 2002/0117020 | A1 | 8/2002 | Novak | |
| 2006/0249112 | A1 | 11/2006 | Maassen | |
| 2011/0220049 | A1* | 9/2011 | Staley | ..................... F01L 1/053 |
| | | | | 123/90.34 |
| 2013/0180488 | A1* | 7/2013 | Arase | ....................... F01L 1/185 |
| | | | | 123/90.34 |
| 2019/0128153 | A1* | 5/2019 | Kataoka | .................. F01L 13/00 |

* cited by examiner

LUBRICATION OF BACKS OF CAMS BY OIL RECOVERY

CROSS-REFERENCE TO RELATED APPLICATIONS

This application is a U.S. national stage application of International Application No. PCT/FR2017/051555, filed on Jun. 15, 2017, which claims priority to French Patent Application No. 1656349, filed on Jul. 4, 2016.

BACKGROUND

Technical Field

The present invention relates to a distribution device of a combustion engine or internal combustion engine of a motor vehicle. The present invention relates more particularly to a system for lubricating a valve actuating device via a camshaft.

The present invention relates more specifically to the lubrication of the contact between a cam and a tongue which forms part of a valve actuating device.

Background Information

In motor vehicles provided with an internal combustion engine or combustion engine, distribution devices are installed therein so as to permit the intake of fresh air or gas into a chamber of a cylinder of the engine and then for the discharge of the burnt gases after combustion in the chamber. The distribution devices comprise valves which are mobile in translation in a cylinder head of the combustion engine. A valve is a mechanical member of the distribution system of combustion engines, permitting the intake of fresh gases and the discharge of burnt gases. Thus a distinction is made between an intake valve which separates the intake duct from the combustion chamber and an exhaust valve which separates the combustion chamber from an exhaust duct. The valve used in the motor vehicle engine is generally a stem valve or poppet valve comprising a stem which is extended at one end via a flared valve head which is designed to seal an orifice of the duct which opens into the combustion chamber.

The valve is generally actuated by a camshaft which is designed to push on the stem of the valve along the axis of the stem. To achieve this, the camshaft bears cams which press against a free end of the valve stem opposing the flared head, the shaft being driven in rotation about an axis substantially at right angles to the axis of the valve stem. The free end of the valve stem is thus pushed by a cam, which is fixed in terms of rotation to the camshaft, toward the combustion chamber of the cylinder to permit the opening of the fresh air intake duct or the burnt gas exhaust duct or evacuation duct. The stem slides in the cylinder head toward the combustion chamber to open an orifice of an air inlet duct or a burnt gas exhaust duct. The valve is then returned into position by one (or more) restoring springs.

The free end of the stem is generally of small section and the contact between the cam and the valve stem may be adversely affected which is liable to cause a malfunction of the combustion engine.

It is known to increase the contact section, for example by the addition of a contact cylinder at the free end of the stem, the contact cylinder being fixed to the stem and enabling the contact between the valve stem and the cam to be more reliable.

It is also known to place a contact tongue between the cam and the valve stem to ensure the transmission of the actuating movement of the cam to the free end of the valve stem. The tongue is generally composed of an arm which is mobile in rotation about an axis perpendicular to the axis of displacement of the valve stem and a tongue head which is designed to bear against the free end of the valve stem. During its rotational movement, the cam bears against a part of the arm of the tongue to cause a displacement in translation of the tongue head and thus of the end of the valve stem.

It is necessary, therefore, to lubricate the contact between the cam and the tongue in order to reduce wear and to make the operation of the valves reliable. To this end, it is known to hollow out lubrication ducts from the cylinder head, one downstream end thereof opening opposite the back of a tongue, for example, or of the cam, in the direction of circulation of the lubricating fluid.

The publication FR 2679601-A1 thus discloses a lubrication device for a cam of an internal combustion engine; the device comprising an oil supply duct connected to an oil supply manifold of the engine and opening into the surface of the cylinder head via an orifice, a jet of oil being sprayed thereby in the direction of the cam.

A drawback with the disclosed device is the requirement to bore such a duct for a cam of the engine and, in particular, between the various ducts present in the cylinder head.

A further drawback is the direction of the flow of oil which is sprayed to reach the contact surface of the cam.

The publication FR 2746846-B1 discloses a lubricating device comprising an arched portion in a chamber housing a camshaft. The arched portion comprises deflection surfaces to return the oil projected from a lubricating channel, which is hollowed-out from the camshaft toward the wall of the chamber, toward the surface of the cam.

A drawback is to create a chamber with larger dimensions in order to form the deflection surfaces.

A further drawback is the effectiveness of the device which does not return the oil in an accurate manner to the surface of the cam.

SUMMARY

One object presented in this disclosure is to remedy these problems. Another object presented in this disclosure is to provide a simple and inexpensive lubricating device designed to supply lubricating liquid in the direction of the contact surface of the cam by means of a distribution tongue of a valve actuating device, arranged in a cylinder head of a combustion engine of a motor vehicle.

The present disclosure relates more particularly to a device for lubricating a contact surface of a cam which is fixed in terms of rotation to a camshaft which is mounted so as to be mobile in rotation in a chamber formed in a cylinder head and a cylinder head cover of a combustion engine of a motor vehicle. The camshaft comprising a longitudinal oil supply duct in addition to a radial discharge orifice, characterized in that the cam has a lateral wall facing the discharge orifice, comprising a conducting device designed to direct the oil from the bottom of the cam in contact with the shaft as far as the contact surface.

Advantageously, the cam has a wall facing the lubricating fluid discharge orifice, comprising a conducting device designed to direct the fluid from the bottom of the cam in contact with the shaft as far as the contact surface of the cam. The lubricating fluid is thus supplied in a simple and accurate manner as far as the contact surface in order to lubricate the contact between the cam and a tongue.

According to further features, the conducting device comprises an oil collection cavity.

Advantageously, the oil conducting device comprises a region for the collection of oil, which permits a significant mass of oil to be collected in order to direct it to the contact surface of the cam.

Advantageously, the conducting device surrounds the camshaft to collect all of the oil deposited on the shaft and on the lateral wall.

Advantageously, the conducting device comprises an opening which opens into the contact surface of the cam and thus permits the oil to be supplied as close as possible to the surface requiring lubrication. The oil is thus supplied in an accurate manner.

Advantageously, the conducting device has a spiral shape for improving the speed of the flow of the oil on the lateral wall.

the conducting device is formed by a groove hollowed out from the lateral wall of the cam facing the discharge orifice.

Advantageously, the conducting device is formed by a groove hollowed out from the lateral wall of the cam, which reduces the weight of the cam and thus of the engine.

Advantageously, the conducting device is formed by a bulged portion extending from the lateral wall, which is easy to produce. The bulged portion may be obtained by moulding and fixed by welding to the wall of the cam.

BRIEF DESCRIPTION OF THE FIGURES

Further features and advantages of the invention will appear from reading the detailed description of particular embodiments provided by way of non-limiting example and shown in the accompanying drawings, in which.

DETAILED DESCRIPTION OF THE FIGURES

Figure 1:
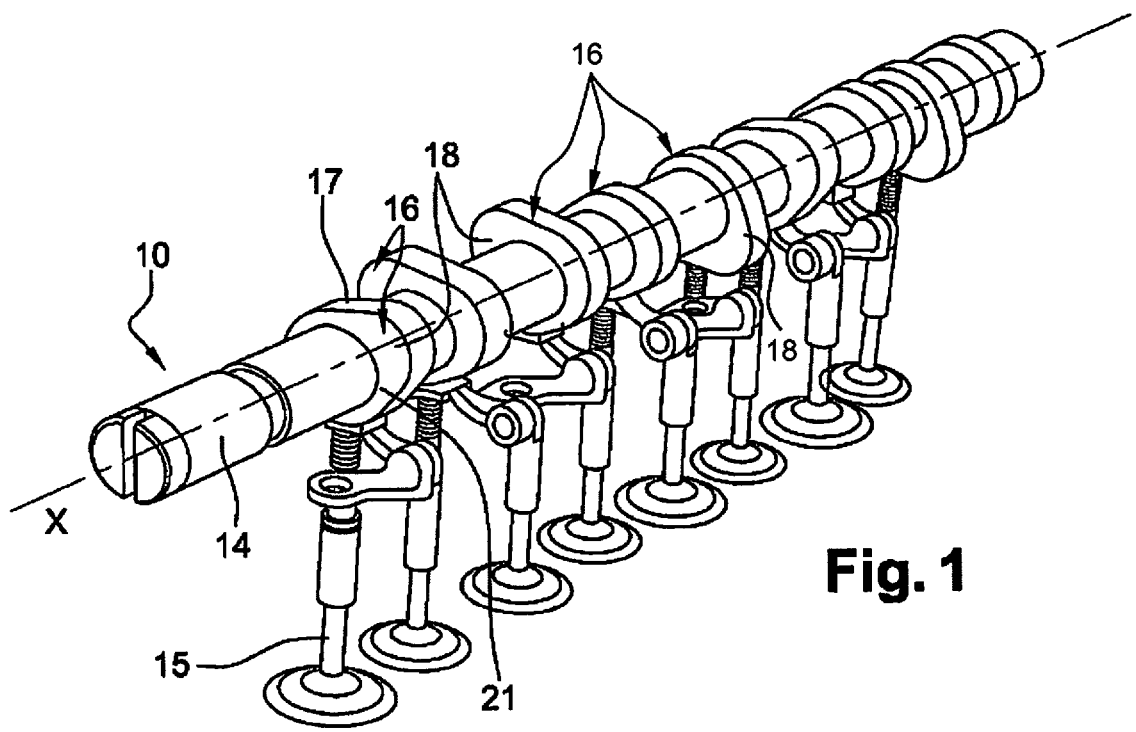
FIG. 1 is a perspective view showing a camshaft with valve actuation.

In the following description, identical reference numerals denote parts which are identical or have similar functions.

Figure 2:
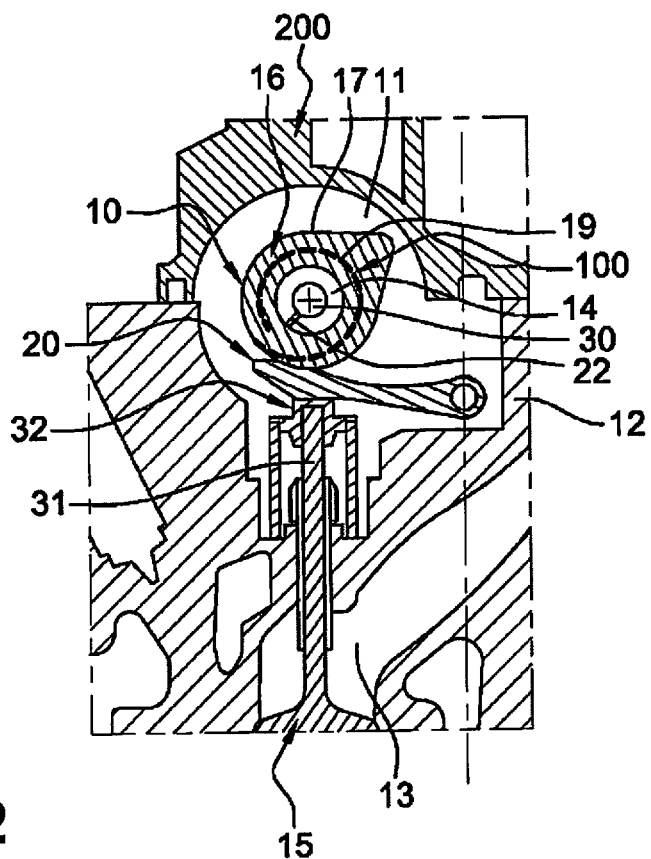
FIG. 2 shows a schematic cross-sectional view of the camshaft illustrated in FIG. 1 with the valve actuating device and the lubricating device of a cam and a tongue according to the illustrated embodiment.

As shown in FIGS. 1 and 2, a valve actuating device 10 is arranged in a chamber 11 in a cylinder head 12 of a combustion engine (only partially shown) to ensure the transmission of the rotational movement of a camshaft 14 to valves 15 and to cause the sliding of the valves along the axis thereof in order to open an air duct or gas duct 13.

In the known manner, the camshaft 14 is mounted in the chamber 11 so as to be mobile in rotation and driven by rotation of a crankshaft (not shown) by means of transmission elements such as a timing chain with toothed wheels (not shown). The camshaft bears a plurality of cams 16 mounted fixedly in rotation on the camshaft 14. The cams 16 have an eccentricity and bear against a stem 31 of the valve 15. A tongue 20 is placed between the cams 16 and the valves 15 to provide the transmission of the movements. According to FIG. 2, via a contact surface 17 between two lateral walls 18 which extend radially from a contact region with the camshaft to the bottom 21 of the cams, the cams 16 bear against the heads of the tongues 20 which then bear against a free end 32 of the stem 31 of the valves 15.

It is necessary, therefore, to provide the lubrication of the contact surfaces 17 between the cams 15 and the tongues 20.

The present disclosure proposes the valve actuating device 10 be provided with a lubricant conducting device 100 for lubricating the surfaces of the cams 16 which comes into contact with the tongues 20 during the rotation of the camshaft 14.

According to FIG. 2, the camshaft 14 comprises an oil supply duct 30 connected to an oil supply manifold (not shown) to supply oil which is then projected through a radial discharge orifice 22 which is hollowed out from the wall of the camshaft 14. The projected oil permits the lubrication of the bearings which hold the camshaft 14 in the chamber 11.

The discharge orifice 22 is arranged between two cams 16, each of the cams 16 having a lateral wall facing the discharge orifice 22. Oil can also flow from the discharge orifice 22 and along the camshaft 14 between two cams 16.

Figure 3:
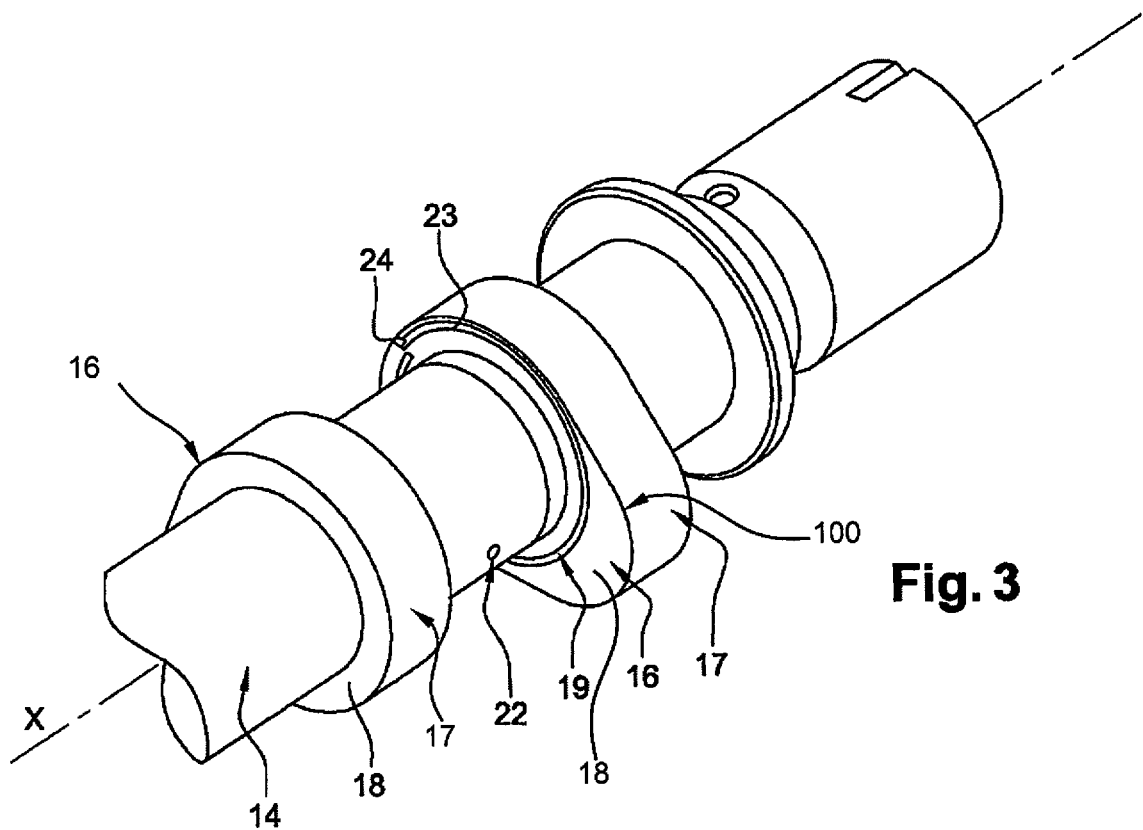
FIG. 3 is a perspective view of a part of the camshaft illustrated in FIG. 1.
Figure 4:
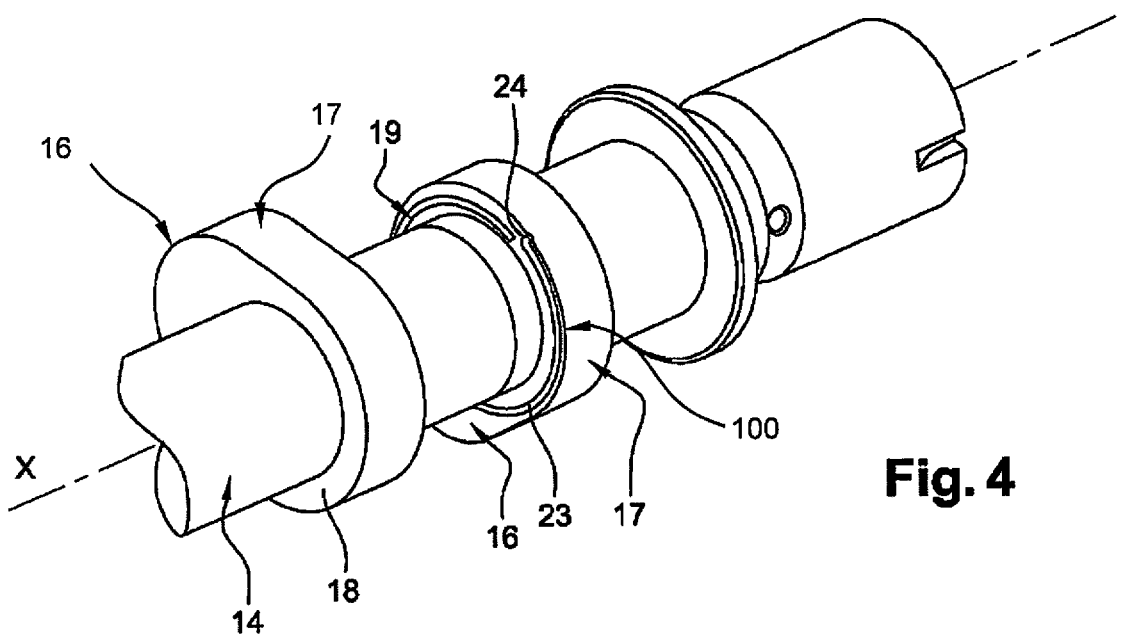
FIG. 4 is a perspective view of a part of the camshaft illustrated in FIG. 1.

As shown in FIGS. 3 and 4, according to a preferred embodiment, the cam 16 comprises the lubricant conducting device 100 in order to collect oil flowing along the camshaft 14 and against the cam 16 and to supply it to the contact surface 17 between the cam and the tongue. The conducting device 100 comprises an oil collection cavity 19. As shown, the collection cavity 19 is formed by a groove 23 hollowed out from the lateral wall and having a spiral shape which surrounds the shaft 14. The spiral-shaped groove comprises an end 24 which opens into the contact surface 17 of the cam 16. Preferably, the end opens into the contact surface 17 of the cam 16 on the side where the cam has a reduced eccentricity in order to facilitate the passage of oil from the groove 23 to the contact surface.

According to a further embodiment, not shown, the conducting device 100 comprises a bulged portion extending from the lateral wall 18 along the axis of the cam 16 coinciding with the axis of the camshaft. The bulged portion surrounds the shaft and is wound in a spiral around the shaft. The bulged portion may comprise an end oriented toward the contact surface to supply oil to the surface. The collection cavity 19 is thus formed by the lateral wall 18 delimited by a spiral-shaped bulged portion. The bulged portion may be obtained by moulding or die stamping, and then welding to the lateral wall.

During the operation of the engine, the camshaft 14 is set in rotation and the cams 16 come to bear against the tongues 20 via the contact surfaces 17 and push a contact head of the tongues 20 in the direction of the valves 15. The tongues 20 are then driven pivotably about the pivot axis X1 parallel to the longitudinal axis X to permit the transmission of the bearing force onto the heads 32 of the valve stems 31. The valve stems 31 are slidably pushed toward the chamber of the cylinder in order to open the gas duct. The cams 14 then release the contact with the tongues 20. The restoring springs of the valve then push back the valve stems 31 in the opposing direction, toward the contact head of the tongues 20 toward the cams 16.

Oil is conducted via the supply duct 30 into the camshaft 14 and emerges through the radial orifice 22. The oil is projected from the discharge orifice 22 and flows along the shaft 14. By the action of centrifugal forces, the oil slides along the lateral wall 18 and is collected in the collection cavity 19. Then it is directed toward the end 24 of the conducting device to reach the contact surface 17 of the cam 16.

One object presented in this disclosure is achieved as follows: the device for lubricating makes it possible for the oil to be conducted in a simple and inexpensive manner onto the contact surface 17 of the cam 16 by means of the tongue.

The projection orifice is bored for the lubrication of the support bearings of the camshaft, which further reduces the cost of producing this device.

It goes without saying that the invention is not limited to these individual exemplary embodiments which are described above by way of example but it encompasses all variants.

The invention claimed is:

1. A valve actuating device comprising:
   a camshaft having an oil supply duct extending in a longitudinal direction of the camshaft and a discharge orifice extending in a radial direction of the camshaft and in fluid communication with the oil supply duct; and
   a cam fixedly mounted to the camshaft so as to rotate with the camshaft, the cam having a contact surface and a lateral wall perpendicular to the longitudinal direction of the camshaft towards the discharge orifice,
   the cam including a spiral shaped groove arranged to direct oil over the lateral wall of the cam towards the contact surface.

2. The valve actuating device as claimed in claim 1, wherein
   the spiral shaped groove forms an oil collection cavity.

3. The valve actuating device as claimed in claim 1, wherein
   the spiral shaped groove surrounds the camshaft.

4. The valve actuating device as claimed in claim 1, wherein
   the spiral shaped groove has an opening which opens into the contact surface of the cam.

5. A vehicle combustion engine comprising the valve actuating device as claimed in claim 1, and further comprising
   a cylinder head including a chamber, and the valve actuating device being arranged in the chamber.

6. A valve actuating device comprising:
   a camshaft having an oil supply duct extending in a longitudinal direction of the camshaft and a discharge orifice extending in a radial direction of the camshaft and in fluid communication with the oil supply duct; and
   a cam fixedly mounted to the camshaft so as to rotate with the camshaft, the cam having a contact surface and a lateral wall perpendicular to the longitudinal direction of the camshaft towards the discharge orifice,
   the cam including a groove disposed in an exposed surface of the lateral wall of the cam that faces the discharge orifice and arranged to direct oil over the lateral wall of the cam towards the contact surface.

7. The valve actuating device as claimed in claim 6, wherein
   the groove forms an oil collection cavity.

8. The valve actuating device as claimed in claim 6, wherein
   the groove surrounds the camshaft.

9. The valve actuating device as claimed in claim 6, wherein
   the groove has an opening which opens into the contact surface of the cam.

10. A vehicle combustion engine comprising the valve actuating device as claimed in claim 6, and further comprising
    a cylinder head including a chamber, and the valve actuating device being arranged in the chamber.

11. A valve actuating device comprising:
    a camshaft having an oil supply duct extending in a longitudinal direction of the camshaft and a discharge orifice extending in a radial direction of the camshaft and in fluid communication with the oil supply duct; and
    a cam fixedly mounted to the camshaft so as to rotate with the camshaft, the cam having a contact surface and a lateral wall perpendicular to the longitudinal direction of the camshaft towards the discharge orifice,
    the cam including a bulged portion extending from the lateral wall and arranged to direct oil over the lateral wall of the cam towards the contact surface.

12. A valve actuating device comprising:
    a camshaft having an oil supply duct extending in a longitudinal direction of the camshaft and a discharge orifice extending in a radial direction of the camshaft and in fluid communication with the oil supply duct; and
    a cam fixedly mounted to the camshaft so as to rotate with the camshaft, the cam having a contact surface and a lateral wall perpendicular to the longitudinal direction of the camshaft towards the discharge orifice,
    the cam including an oil collection cavity formed by a groove disposed in an exposed surface of the lateral wall of the cam that faces the discharge orifice and arranged to direct oil over the lateral wall of the cam towards the contact surface.

13. The valve actuating device as claimed in claim 12, wherein
    the groove surrounds the camshaft.

14. The valve actuating device as claimed in claim 12, wherein
    the groove has an opening which opens into the contact surface of the cam.

15. The valve actuating device as claimed in claim 14, wherein
    the groove surrounds the camshaft.

* * * * *